(12) United States Patent
Grönvall

(10) Patent No.: US 7,980,527 B2
(45) Date of Patent: Jul. 19, 2011

(54) FASTENING SPIDER AND METHOD OF FASTENING

(75) Inventor: Lars Grönvall, Trelleborg (SE)

(73) Assignee: Metso Minerals (Wear Protection) AB, Trelleborg (SE)

( * ) Notice: Subject to any disclaimer, the term of this patent is extended or adjusted under 35 U.S.C. 154(b) by 41 days.

(21) Appl. No.: 11/922,792

(22) PCT Filed: Jun. 27, 2006

(86) PCT No.: PCT/SE2006/000781
§ 371 (c)(1),
(2), (4) Date: Feb. 23, 2009

(87) PCT Pub. No.: WO2007/008135
PCT Pub. Date: Jan. 18, 2007

(65) Prior Publication Data
US 2009/0173857 A1    Jul. 9, 2009

(30) Foreign Application Priority Data

Jul. 8, 2005 (SE) ........................................ 0501605

(51) Int. Cl.
A47B 97/00 (2006.01)
(52) U.S. Cl. .................... 248/500; 248/509; 241/182
(58) Field of Classification Search .............. 248/488, 248/500, 509, 507; 241/182
See application file for complete search history.

(56) References Cited

U.S. PATENT DOCUMENTS

| 1,242,074 | A | * | 10/1917 | Thomas | 248/509 |
|---|---|---|---|---|---|
| 3,318,537 | A | * | 5/1967 | Ake et al. | 241/183 |
| 3,942,239 | A | * | 3/1976 | Johansson | 29/462 |
| 3,961,453 | A | * | 6/1976 | Couwenbergs | 52/509 |
| 4,424,938 | A | * | 1/1984 | Day | 241/182 |
| 4,673,152 | A | * | 6/1987 | Brown | 248/216.1 |
| 4,858,875 | A | * | 8/1989 | Nielsen | 248/488 |
| 5,487,523 | A | * | 1/1996 | Ingram et al. | 248/551 |
| 5,494,178 | A | * | 2/1996 | Maharg | 211/189 |
| 5,586,005 | A | * | 12/1996 | Cipolla et al. | 361/719 |
| 6,189,280 | B1 | * | 2/2001 | Malmberg | 52/506.05 |
| 2003/0062372 | A1 | * | 4/2003 | Malmberg | 220/500 |
| 2003/0197107 | A1 | * | 10/2003 | Herbison | 248/500 |

FOREIGN PATENT DOCUMENTS

DE          4315421        11/1993
* cited by examiner

Primary Examiner — Terrell McKinnon
Assistant Examiner — Bradley H Duckworth
(74) Attorney, Agent, or Firm — Kinney & Lange, P.A.

(57) ABSTRACT

A fastening spider (1) and a method of fastening a wear-resistant lining element (2) to a support surface (3), over which wear-resistant lining element (2) material in the form of pieces or particles is intended to move. The fastening spider (1) comprises a mounting portion (5) for mounting positioning and clamping to the support surface (3) and at least one leg (8a-8b) projecting from the mounting portion (5) and having an underside for holding the wear-resistant lining element (2) to the support surface (3). The underside of the leg has an outer portion (10) and an inner portion (11), the inner portion (11) being positioned closer to the mounting portion (5) than the outer portion (10). The outer portion (10) is, at least in the mounting positioning of the mounting portion, positioned closer to the support surface (3) than the inner portion (11).

15 Claims, 3 Drawing Sheets

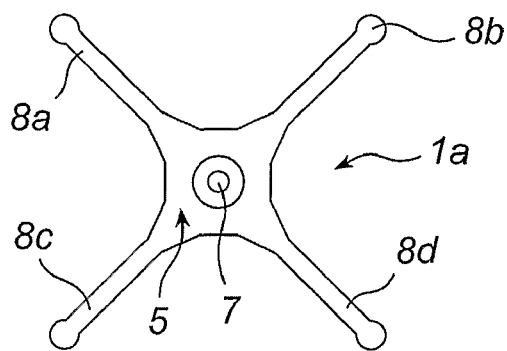
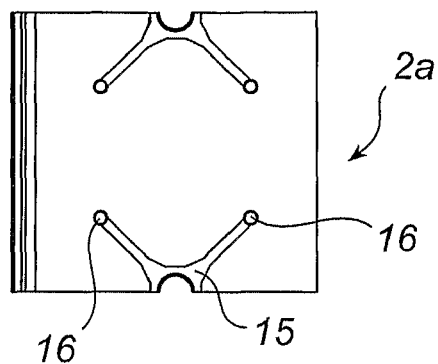
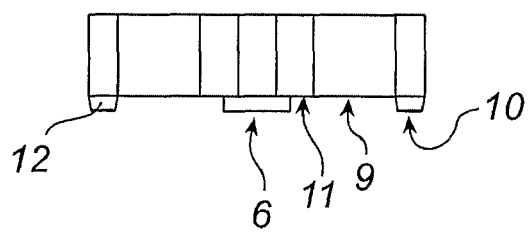
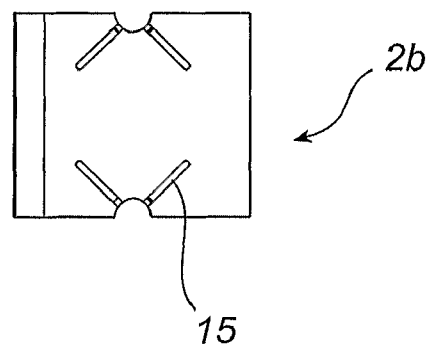
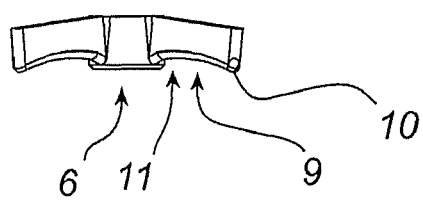

FASTENING SPIDER AND METHOD OF FASTENING

FIELD OF THE INVENTION

The present invention relates to a fastening spider for fastening a wear-resistant lining element to a support surface, over which wear-resistant lining element material in the form of pieces or particles is intended to move. The fastening spider comprises a mounting portion for mounting positioning and clamping to the support surface and at least one leg projecting from the mounting portion and having an underside for holding the wear-resistant lining element to the support surface. The underside of the leg has an outer portion and an inner portion, the inner portion being positioned closer to the mounting portion than the outer portion.

The invention also relates to a wear lining and a method of fastening a wear-resistant lining element to a support surface, over which wear-resistant lining element material in the form of pieces or particles is intended to move.

BACKGROUND ART

There are many different types of fastening means for fastening wear-resistant lining elements to a support surface for the purpose of protecting the support surface from wear. This is common in handling materials such as sand, gravel, stone, ore etc. which, with or without water being added, cause significant wear on the surfaces over which the material moves. For a long service life of the surface, it is coated with wear-resistant lining elements of wear resistant material, such as elastomeric material, some type of ceramic or a combination thereof. The wear lining gives wear protection to, among other things, chutes, drums, bins, feeders, feed hoppers, transhipment places and vehicle platforms in the stone-working, mining and installation industry. Due to the large number of different applications where wear linings are used as wear protection, the wear linings are often manufactured to allow adjustment and cutting to suit a certain type and shape of surface. It is important that the wear lining be well fastened to the support surface so that it remains in place when subjected to vibrations, shocks and impacts. In many cases it is also desirable to be able to quickly exchange the wear lining as it starts to be worn out.

A general drawback of existing fastening devices and methods of fastening wear-resistant lining elements to a surface is that they are relatively complicated and expensive in terms of both construction and installation. A further drawback is that the fastening devices do not always effectively fasten the wear-resistant lining elements to the support surface, or that the fastening, when mechanically affected, is not capable of holding the wear lining in place. This results in production troubles on the one hand since a loose wear lining must be fastened again and, on the other hand, because they are damaged more easily and thus must be replaced prematurely.

DE 43 15 421 discloses a fastening element for fastening, for instance, wear-resistant lining elements of elastomeric material to a surface. The element has the shape of a four-armed cross with a central mounting portion to fasten the fastening element to a surface using, for instance, a bolted joint. The arms then help to hold the wear lining which after mounting is clamped between the arms and the support surface. The fastening element is made in the form of a long steel section which is then cut to provide fastening elements of the desired thickness.

The problem in connection with this fastening element is, among other things, that the wear-resisting lining element is not sufficiently effectively fastened to the support surface. This results in operating troubles and, thus, increased costs in the contexts where the element is used.

EP 1 058 801 and the brochure "Trellex SQ Modulsystem" published by the Applicant in 2001 describe a wear lining which is made of a number of juxtaposed wear-resistant lining elements of elastomeric material. The wear-resistant lining elements are in the form of panels with two large faces and two connecting narrow faces and are clamped to the support surface by a fastening means in the form of bolts and washers. The wear-resistant lining elements have at the two opposite narrow faces V-shaped recesses which are open towards the narrow faces. The fastening means consist of washers with V-shaped projections which are arranged in the V-shaped recesses and abut against the recesses of the narrow faces after clamping the washers by means of the bolts.

Although the wear lining according to EP 1 058 801 is a multipurpose lining and effective, it happens that the wear-resistant lining elements do not sufficiently effectively abut against the support surface. As mentioned above, this causes additional costs in the form of stoppage and the necessary replacement of damaged wear-resistant lining elements.

Summing up, the technicians have problems with increased costs in the form of stoppage, the necessary replacement of damaged wear-resistant lining elements, increased wear etc. An important factor is here that wear-resistant lining elements do not sufficiently effectively abut against a support surface on which they are mounted. A further problem is that increased noise occurs as material moves over an insufficiently fastened wear-resistant lining element.

SUMMARY OF THE INVENTION

An object of the present invention is to provide an improvement of the above techniques.

In particular, an object of the invention is to provide abutment of wear-resistant lining elements against a surface, which is reliable, easy and inexpensive to maintain, has a simple construction and a low manufacturing cost.

An object is also to provide a fastening device which effectively fastens wear-resistant lining elements to a support surface and which, when mechanically affected, is capable of holding the wear lining in place.

Another object is to provide reduced noise as material in the form of pieces or particles moves over a wear-resistant lining element.

To achieve these and other objects, there are provided according to the invention a fastening spider, a wear lining and a method of fastening, having the features defined in the main claims. Preferred embodiments are stated in the subclaims.

According to a first alternative, a fastening spider is thus provided for fastening a wear-resistant lining element to a support surface, over which wear-resistant lining element material in the form of pieces or particles is intended to move, comprising a mounting portion for mounting positioning and clamping to the support surface and at least one leg projecting from the mounting portion and having an underside for holding the wear-resistant lining element to the support surface, said underside having an outer portion and an inner portion, the inner portion being positioned closer to the mounting portion than the outer portion. The outer portion is, at least in the mounting positioning of the mounting portion, positioned closer to the support surface than the inner portion.

The expression "mounting positioning" refers in this patent application to the position of the mounting portion of the spider just before it is being fastened to the support surface, for instance by means of a through bolted joint or a welded bolt. If a bolted joint is used, the bolt extends through a hole in the mounting portion and also a hole in support surface, but the actual joint is not tightened. By "clamping" is meant the state of the mounting portion when, for instance, the bolted joint is fully tightened. In brief, "mounting positioning" can be illustrated, for instance, with the position of the fastening spider when it is placed with its underside against a horizontal flat support surface, with its mounting portion immediately above the mounting point on the support surface.

The difference in the positioning of the fastening spider relative to the support surface in "mounting positioning" and "clamping" is thus essentially the distance to the support surface along the normal direction of the support surface. With a completely flat support surface, the difference is the distance to the support surface along the normal direction of the support surface.

A general advantage of the invention according to this alternative is that it will be possible to make a fastening spider of the above type which has a simple construction and is easy and inexpensive to manufacture, install and replace.

A special advantage is that the fastening spider effectively holds wear-resistance lining elements to a support surface. This is achieved by the above-described shape distributing clamping force, via the mounting portion, uniformly in the legs of the fastening spider. In this way, the holding force of the spider legs against the wear-resistant lining element will be greater in the outer portions of the leg, compared with prior-art technique. Traditionally, a greater holding force occurs in portions close to the mounting portion, for instance because the spider legs tend to be bent in clamping of the fastening spider, which is one of the effects that are counteracted by the described invention.

It should be noted that that part of the wear-resistant lining element which is clamped between a spider leg and a support surface is often made of an elastomeric material which can partly yield to or be depressed by forces applied. This also promotes the effect and advantage that the force exerted by the spider is more uniformly distributed in the legs of the fastening spider.

Another advantage is reduced noise as material in the form of pieces or particles moves over a wear-resistant lining element which is fastened according to the invention.

The fastening spider may, in the mounting positioning of the mounting portion, be arranged to be in contact with the support surface or the wear-resistant lining element, merely using the outer portion on the underside of the leg.

The fastening spider may also, in the mounting positioning of the mounting portion, be arranged to be in contact with the support surface or the wear-resistant lining element, using the underside of the mounting portion.

The fastening spider may, also when clamped to the support surface, in combination or separately, have the underside of the entire leg positioned at the same distance from the support surface, have merely the outer portion on the underside of the leg in contact with the support surface, and/or have the underside of the mounting portion in contact with the support surface.

In one embodiment, the fastening spider may, after being clamped to the support surface, be resilient, which is an effect of the mounting portion not being in direct contact with the support surface. It is also possible to provide rigid fastening if the mounting portion is clamped so that it abuts rigidly against the support surface, the wear-resistant lining element or a combination thereof.

The fastening spider may, also on the underside of the leg, have at least one projecting supporting point directed towards the support surface. The supporting point may in turn extend down into through holes in the wear-resistant lining element, extend into recesses in the wear-resistant lining element and/or be pressed into the wear-resistant lining element.

The underside of the leg of the fastening spider may also be arched in the form of an arch which, seen from the position for mounting positioning, is convex from the support surface.

According to a second alternative, a wear lining is provided, over which material in the form of pieces or particles is intended to move, comprising at least one wear-resistant lining element fastened to a support surface by means of at least one fastening spider, said fastening spider having a mounting portion for mounting positioning and clamping to the support surface and at least one leg projecting from the mounting portion and having an underside for holding the wear-resistant lining element to the support surface, said underside having an outer portion and an inner portion, the inner portion being positioned closer to the mounting portion than the outer portion. The outer portion is, at least in the mounting positioning of the mounting portion, positioned closer to the support surface than the inner portion.

The fastening spider in the wear lining above can be designed in the different ways that have been described above for the individual fastening spider. For instance, the leg on the fastening spider of the wear lining may have an underside with at least one supporting point projecting towards the support surface, and the supporting point may extend down into through holes in the wear-resistant lining element.

The wear lining may, in the mounting positioning of the spider mounting portion, have a fastening spider which is in contact with the support surface or the wear-resistant lining element, using merely the outer portion of the underside of the spider leg.

Also a method of fastening a wear-resistant lining element to a support surface is provided, over which wear-resistant lining element material in the form of pieces or particles is intended to move, comprising the steps of placing the wear-resistant lining element on the support surface, placing a fastening spider on the wear-resistant lining element, clamping the fastening spider to the support surface, which fastening spider has a mounting portion and at least one leg projecting from the mounting portion and having an underside for holding the wear-resistant lining element to the support surface, which underside has an outer portion and an inner portion, the inner portion being positioned closer to the mounting portion than the outer portion. The method is characterised in that in the step of placing the fastening spider on the wear-resistant lining element, the outer portion on the underside of the spider leg is positioned closer to the support surface than the inner portion on the underside of the spider leg.

The wear lining with the described fastening spider and also the method of fastening a wear lining element to a support surface have the same advantages as the above-described fastening spider.

BRIEF DESCRIPTION OF THE DRAWINGS

The invention will in the following be described in more detail with reference to the accompanying drawings which by way of example illustrate currently preferred embodiments of the invention. Equivalent components in the drawings have the same reference numerals.

FIG. 3 is a top plan view of a first embodiment of the fastening spider.

FIG. 4 is a side view of the fastening spider according to FIG. 3.

FIG. 5 is a top plan view of a wear-resistant lining element which can be fastened by the fastening spider according to FIG. 3.

FIG. 6 is a top plan view of a second embodiment of the fastening spider.

FIG. 7 is a side view of the fastening spider according to FIG. 6.

FIG. 8 is a top plan view of a wear-resistant lining element which can be fastened by the fastening spider according to FIG. 6.

DESCRIPTION OF PREFERRED EMBODIMENTS

Figure 1:
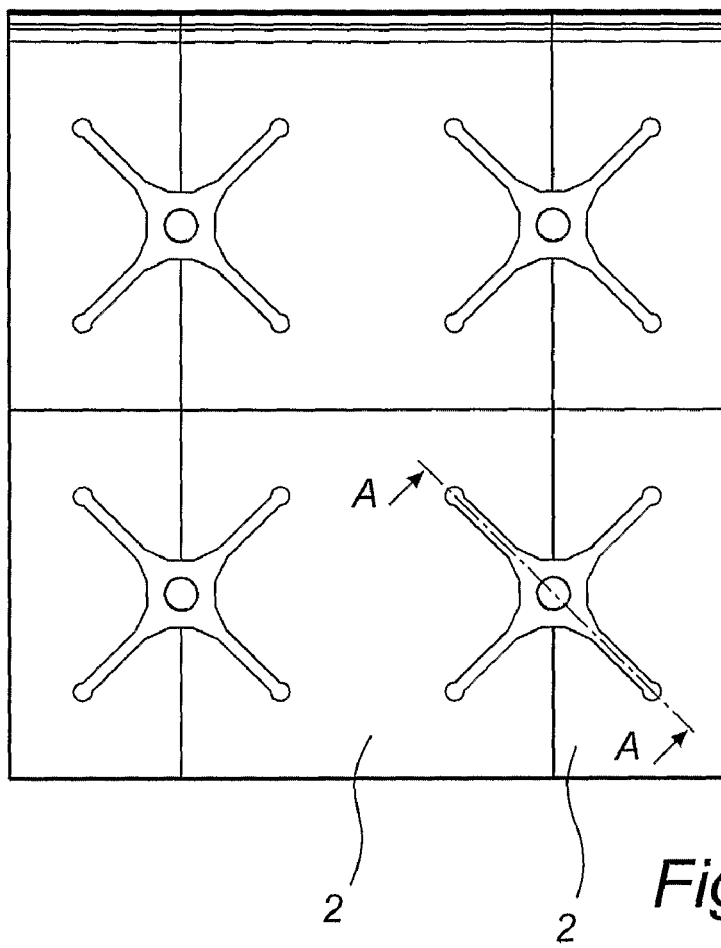
FIG. 1 is a top plan view of a wear lining with a fastening spider according to the invention.
Figure 2:
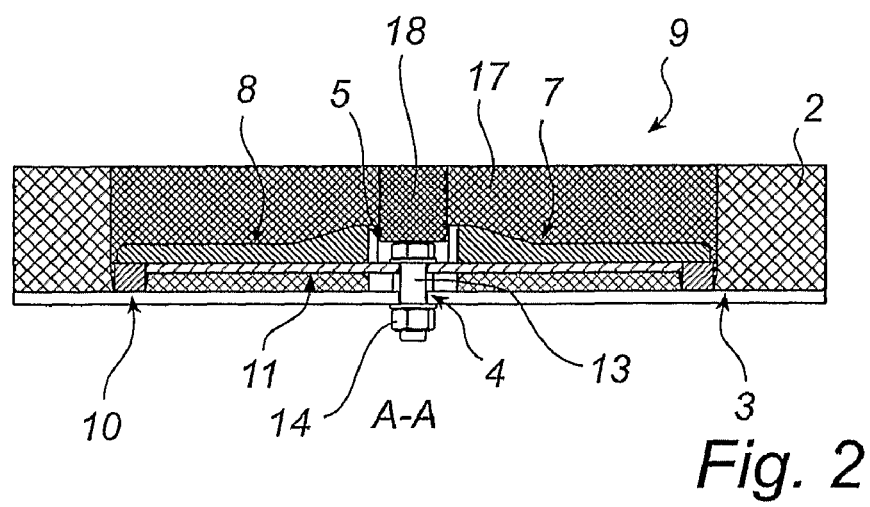
FIG. 2 is a view along line A-A in FIG. 1.
Figure 9:
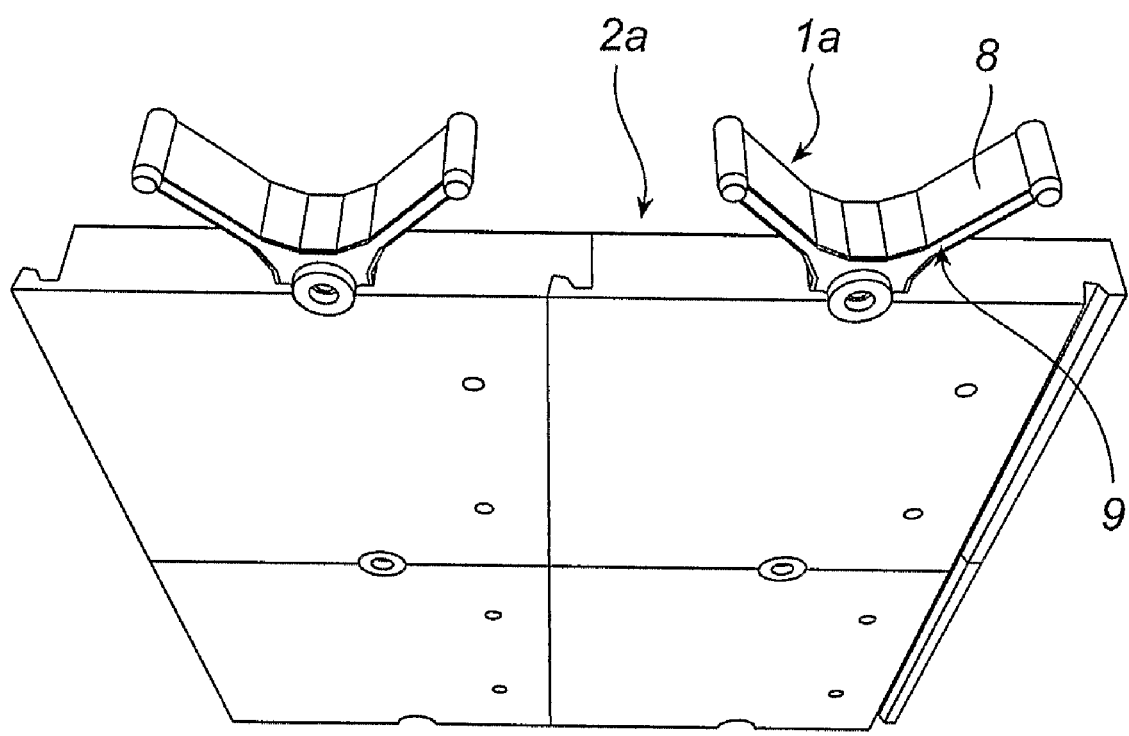
FIG. 9 is a perspective view of the fastening spider according to FIG. 3 and the wear-resistant lining element according to FIG. 5.

FIGS. 1 and 2 illustrate a wear lining 19 with a fastening spider 1 which fastens two wear-resistant lining elements 2 to a support surface 3. The support surface 3 has a mounting point 4 in the form of a through hole.

FIGS. 3 and 4 illustrate the fastening spider 1a which has a central mounting portion 5. The mounting portion 5 has an underside 6, a through hole 7 and four projecting legs 8a-8d. Each leg has an underside 9 which in turn has an outer portion 10 and an inner portion 11. In this embodiment, the outer portion 10 has a supporting point 12 directed towards the support surface 3. The fastening of the fastening spider 1a to the mounting point 4 occurs by means of a bolt 13 which extends through the mounting point 4 of the support surface and the hole 7 of the mounting portion. The bolt 13 is tightened by means of a nut 14.

FIG. 5 illustrates the wear-resistant lining element 2a which is intended for the fastening spider 1a according to FIG. 3. The wear-resistant lining element 2a has recesses 15 for two of the four legs 8a-8d of the fastening spider 1a. A through hole 16 is formed at the end of the recess 15 and adapted to receive the supporting point 12 of a leg 8a-8d.

In mounting, two wear-resistant lining elements 2a are placed on the support surface 3 with the recesses 15 of the elements adjoining each other. The fastening spider 1a is then placed in the recesses 15 and then fastens one side each of two wear-resistant lining elements 2a. The supporting points 12 abut against the support surface 3 and the legs 8a-8d exert pressure, towards the support surface, on the surface of the recesses 15 of the wear-resistant lining element.

When the bolt 13 is tightened, the clamping force is distributed, via the mounting portion 5, uniformly in the legs 8a-8d of the fastening spider. In this way, the holding force of the spider legs against the wear-resistant lining element 2 or the support surface 3 will be greater in the outer portions 10 of the legs 8a-8d, compared with prior art.

With the bolt 13 tightened, the recesses 15 of the wear-resistant lining element are filled with a fill spider 17 and, optionally, a fill cylinder 18. The effect of such filling is that the wear lining 19 will have a substantially flat and even surface.

FIGS. 6-8 illustrate a wear-resistant lining element 2b without through holes corresponding to the holes 17 in the embodiment according to FIGS. 3-5, and a fastening spider 1b with an arched underside 9. Just like before, the fastening spider 1b has a central mounting portion 5 with an underside 6, a through hole 7 and four projecting legs 8a-8d. Each leg has an arched underside 9 which in turn has an outer portion 10 and an inner portion 11. Mounting is performed in a manner corresponding to the manner described above.

Of course, the fastening spider 1a can be used together with the wear-resistant lining element 2b and vice versa. It is also possible to combine, in terms of construction, the two embodiments of fastening spider and wear-resistant lining element, respectively. It is also possible to press a spider into a wear-resistant lining element without holes or recesses being prepared. However, in most cases through holes will result in the safest holding of the wear-resistant lining element. Depending on how firmly the bolt is tightened, it will also be possible to obtain a more or less flexibly fastened spider which is allowed to be resilient substantially in the longitudinal direction of the bolt. If the underside of the spider mounting portion reaches the support surface during clamping, a rigid joint is obtained.

The number of legs on the spider is optional, but is preferably two or four. The wear-resistant lining element and also the fill spider and/or the fill cylinder can be reinforced and are preferably made of wear-resistant elastomeric materials, such as rubber or polyurethane, but may also be selected from the group consisting of steel, plastic and composite material, with or without wear-resistant reinforcements of, for instance, ceramic material. The spider and/or the support surface can be made of more or less flexible materials from the group consisting of steel, plastic and composite material or a combination thereof. The spider may also be reinforced in a suitable manner, for instance with reinforcing irons, carbon or glass fibre or some other plastic or elastomeric material having a rigidity which is different from that of the other material of the spider. The number of supporting points on the underside of the spider leg may vary between one and as many as can be arranged in consideration of the length of the underside and the size of the supporting points.

It will be appreciated that a person skilled in the art can modify the above-described fastening spider and the above-mentioned wear lining including a fastening spider in various ways and still utilise the advantages of the variants that have been illustrated in the embodiments above.

The invention claimed is:

1. A fastening spider for fastening a wear-resistant lining element to a support surface, over which wear-resistant lining element material in the form of pieces or particles is intended to move, comprising:

a mounting portion for mounting positioning and clamping to the support surface and at least one leg projecting from the mounting portion and having an underside for holding the wear-resistant lining element to the support surface, said underside having an outer portion and an inner portion, the inner portion being positioned closer to the mounting portion than the outer portion, the leg having a length and a width, wherein the length is longer then the width, wherein the outer portion is, at least in the mounting positioning of the mounting portion, positioned closer to the support surface than the inner portion, and wherein in the mounting positioning of the mounting portion, the fastening spider is arranged to be in contact with the support surface or the wear-resistant lining element, merely using the outer portion on the underside of the leg.

2. A fastening spider as claimed in claim 1, wherein, in clamping to the support surface, all of the underside of the leg is arranged to be positioned at the same distance from the support surface.

3. A fastening spider as claimed in claim 1, wherein, in clamping to the support surface, only the outer portion on the underside of the leg is arranged to be in contact with the support surface.

4. A fastening spider as claimed in claim 1 wherein, in clamping to the support surface, the underside of the mounting portion is arranged to be in contact with the support surface.

5. A fastening spider as claimed in claim 1 wherein, in clamping to the support surface, the fastening spider is arranged to be resilient.

6. A fastening spider as claimed in claim 1, wherein the underside of the leg is arched.

7. A fastening spider as claimed in claim 1, wherein the underside of the leg has at least one projecting supporting point.

8. A fastening spider as claimed in claim 7, wherein the supporting point is arranged to extend down into through holes in the wear-resistant lining element.

9. A fastening spider as claimed in claim 7, wherein the supporting point is arranged to extend into recesses in the wear-resistant lining element.

10. A fastening spider as claimed in claim 7, wherein the supporting point is arranged to be pressed into the wear-resistant lining element.

11. A wear lining over which material in the form of pieces or particles is intended to move, comprising:
   at least one wear-resistant lining element fastened to a support surface by means of at least one fastening spider, said fastening spider having a mounting portion for mounting positioning and clamping to the support surface; and
   at least one leg projecting from the mounting portion and having an underside for holding the wear-resistant lining element to the support surface, said underside having an outer portion and an inner portion, the inner portion being positioned closer to the mounting portion than the outer portion, the leg having a length and a width, wherein the length is longer then the width,
   wherein the outer portion is, at least in the mounting positioning of the mounting portion, positioned closer to the support surface than the inner portion, and
   wherein, in the mounting positioning of the mounting portion, the fastening spider is arranged to be in contact with the support surface or the at least one wear-resistant lining element, merely using the outer portion on the underside of the leg.

12. A wear lining as claimed in claim 11, wherein the underside of the leg has at least one supporting point projecting towards the support surface.

13. A wear lining as claimed in claim 12, wherein the supporting point extends down into through holes in the wear-resistant lining element.

14. A wear lining as claimed in claim 11, wherein, in the mounting positioning of the mounting portion, the fastening spider is in contact with the support surface or the wear-resistant lining element, merely using the outer portion of the underside of the leg.

15. A method of fastening a wear-resistant lining element to a support surface, over which wear-resistant lining element material in the form of pieces or particles is intended to move, comprising the steps of:
   placing the wear-resistant lining element on the support surface,
   placing a fastening spider on the wear-resistant lining element, and
   clamping the fastening spider to the support surface, which fastening spider has a mounting portion and at least one leg projecting from the mounting portion and having an underside for holding the wear-resistant lining element to the support surface, said underside having an outer portion and an inner portion, the inner portion being positioned closer to the mounting portion than the outer portion, the leg having a length and a width, wherein the length is longer then the width,
   wherein in the step of placing the fastening spider on the wear-resistant lining element, the outer portion on the underside of the spider leg is positioned closer to the support surface than the inner portion on the underside of the spider leg.

* * * * *